Patented June 13, 1950

2,511,258

UNITED STATES PATENT OFFICE 2,511,258

COPOLYMERS OF CYCLIC FLUORINE-CONTAINING COMPOUNDS

Jesse Harmon, Wilmington, Del., assignor to E. I. du Pont de Nemours & Company, Wilmington, Del., a corporation of Delaware No Drawing. Application March 16, 1948, Serial No. 15,279

15 Claims. (Cl. 260—87.5)

This invention relates to a new class of fluorine-containing polymers, and more particularly refers to new cyclic fluorine-containing organic copolymers.

This case is a continuation-in-part of Harmon application Serial No. 695,031, filed September 5, 1946, now abandoned, which is a continuation-in-part of Harmon application Serial No. 501,149, filed September 3, 1943, now Patent No. 2,436,142, issued February 17, 1948.

In recent years considerable attention has been given to fluorine compounds and to their preparation. However, to date the number of known unsaturated fluorine-containing organic compounds is relatively small, and their methods of preparation have been laborious and expensive. The methods of preparation of fluorine compounds usually consist of replacing part or all of the bromine or chlorine atoms with fluorine by means of expensive and hazardous inorganic fluorinating agents such as metallic fluorides, silver fluoride, antimony fluorides, mercuric fluoride, or hydrogen fluoride. In the present invention a new class of polymers of unsaturated organic fluorine compounds is prepared readily and without using dangerous or expensive inorganic fluorinating reagents.

This invention has as an object new organic fluorine-containing copolymers. A further object is a new class of cycloorganic fluorine-containing copolymers. Further objects reside in methods for preparing these copolymers. Additional objects will become apparent from an examination of the following description and claims.

These objects are accomplished by the preparation of copolymers of monomeric fluorocyclobutenes, preferably polyfluorocyclobutenes, with a polymerizable, monomeric, ethylenically unsaturated compound having a terminal carbon-to-carbon double bond. The copolymers thus prepared contain 3 to 70% of the fluorocyclobutene, and preferably from 10 to 50% of the fluorocyclobutene.

The prefix "polyfluoro" as used herein refers to the number of fluorine atoms and not to polymeric materials.

The monomeric fluorocyclobutenes employed in the present invention are prepared as described in the Harmon application Serial No. 501,149, filed September 3, 1943, now Patent No. 2,436,142, issued February 17, 1948. Monomeric fluorocyclobutenes are prepared by dehalogenating the corresponding halogen-containing monomeric fluorocyclobutene. Other methods of preparing said members include dehydrohalogenation, dehydration, deacetylation, dehydrogenation, and pyrolysis of monomeric fluorocyclobutanes.

The equipment used in the preparation of the products of this invention may be constructed of glass or of various metals such as iron, steel, aluminum, Monel metal, or copper.

The following examples, in which proportions are given in parts by weight unless otherwise specified, are given for illustrative purposes and are not intended to place any restrictions or limitations on the herein described invention:

Example I

A stainless-steel, high-pressure reactor was flushed with nitrogen, and 25 parts of distilled water and 0.1 part of benzoyl peroxide were added. After the reactor was evacuated, cooled, and charged with 10 parts of hexafluorocyclobutene and 28 parts of ethylene, the polymerization mixture was heated at about 80° C. with agitation for 8 hours. The pressure in the system during the polymerization was maintained at about 800 to 990 atmospheres by the intermittent injection of water. When the pressure appeared to remain practically constant, indicating no further polymerization was taking place, the reactor was cooled to room temperature, the pressure was released and the polymer was dried under reduced pressure. There was obtained 24.5 parts of a rubbery ethylene-hexafluorocyclobutene polymer containing 20.64% fluorine. This corresponds to a copolymer containing 29.3% hexafluorocyclobutene.

Polymerization of hexafluorocyclobutene with tetrafluoroethylene in a similar manner yielded a hexafluorocyclobutene/tetrafluoroethylene copolymer which softened at about 310° C.

Example II

A stainless-steel shaker tube was flushed with nitrogen, and 200 parts of water essentially free of dissolved oxygen and 0.4 part of benzoyl peroxide were added. The reactor was evacuated and then charged with 15 parts of hexafluorocyclobutene and 80 parts of tetrafluoroethylene. The reaction mixture was heated at 79–81° C. for 8.5 hours under a pressure of 2000–2500 p. s. i. maintained by the intermittent injection of water which was substantially free of dissolved oxygen. In this manner 30 parts of a hexafluorocyclobutene-tetrafluoroethylene copolymer was obtained. The product was much more readily melt-extrudable than polytetrafluoroethylene prepared under similar conditions. Films of the copolymer were prepared in a compression mold heated to 370° C.

*Example III*

Tetrafluoroethylene was pressured continuously at 50 lbs./sq. in. into a pressure reaction vessel containing an agitated aqueous reaction mixture at room temperature containing approximately 5 parts of hexafluorocyclobutene, 0.1 part of ammonium persulfate, and 0.05 part of sodium bisulfite in 200 parts of water. Polymerization took place and, after 6.5 parts of tetrafluoroethylene had been absorbed, the reaction was stopped and 9 parts of copolymer containing about 28% hexafluorocyclobutene was isolated by filtering it from the reaction medium and washing it with distilled water.

The dry copolymer was pressed into films on a laboratory press at 340° C. and 2,000 lbs./sq. in. pressure. These films after quenching were sufficiently tough to be creased without breaking.

The novel products of this invention are copolymers of fluorocyclobutenes, i. e., copolymers prepared from compounds containing at least one fluorine-containing cyclobutene ring.

The monomeric fluorocyclobutenes used in this invention may be represented by the general formula

wherein the R substituents are monovalent radicals selected from the group consisting of hydrogen, halogens and monovalent organic radicals, and at least one of the R substituents is fluorine. Examples of monovalent organic radicals contemplated include alkyl, alkenyl, alkynyl, cycloalkyl, aryl, aralkyl, alkoxy, ester, cyano, carboxyl, carbalkoxy, amido, acyl, formyl and methylol radicals.

While appreciable effects are obtained when the monomeric fluorocyclobutene compounds used in this invention contain but one fluorine atom in the four-carbon atom ring, it is to be understood that substantially increased effects are had when said compounds are polyfluorocyclobutenes, i. e., contain at least two fluorine atoms in the cyclobutene ring. On account of the superior properties of the resulting copolymers, the monomeric polyfluorocyclobutene compounds which are preferred for use in this invention are those having the general formula

wherein R is a monovalent radical selected from the group consisting of hydrogen, halogens and monovalent organic radicals, and the X substituents are selected from the group consisting of hydrogen and halogens. Included among these polyfluorocyclobutene compounds are those having formulas of the type

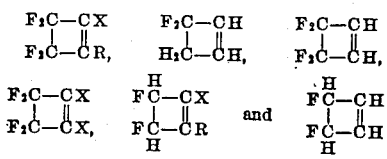

where X and R are defined as herein stated. The completely halogenated monomeric cyclobutenes having the general formula

where X is halogen, and particularly hexafluorocyclobutene

are preferred.

In the preparation of the copolymers, the fluorocyclobutene is copolymerized in the presence of a polymerization catalyst with one or more ethylenically unsaturated monomers. Preferably, the comonomer has a terminal carbon-to-carbon double bond. Ethylenically unsaturated compounds suitable for use as comonomers include vinyl and vinylidene compounds; vinyl esters, vinyl acetate, vinyl chloride, vinyl fluoride; acrylic and methacrylic acids and their derivatives such as esters, methyl ester, anhydride, amide, nitrile; olefinic hydrocarbons, ethylene, styrene, propylene, isobutylene; dienes, butadiene, chloroprene, fluoroprene, isoprene; vinylidene halides, vinylidene chloride; tetrafluoroethylene, and the like. As illustrated by the examples, the preferred ethylenically unsaturated comonomers have the formula $X_2C=CX_2$, where X is hydrogen or fluorine. In the copolymers the fluorocyclobutene is present in the proportion of from 3 to 70% based on the total weight of the copolymer. Copolymers containing from 10–50% of the cyclic fluorine-containing monomer are the more preferred compositions since they are the easiest to prepare and show the most pronounced difference from the homopolymers.

The aforementioned polymerization reactions may be effected in bulk, in solution, or in emulsion. Polymerization catalysts which can be used include ultra-violet light, oxygen, Friedel-Crafts type catalysts, and free radical-producing types of catalysts such as peroxy and azo compounds. The free radical-producing type of catalyst, that is, one which generates free radicals under polymerization conditions, is preferred. These include peroxy compounds such as diacyl peroxides, benzoyl peroxide, lauroyl peroxide, diethyl peroxide, tertiary butyl hydroperoxide, hydrogen peroxide, persulfates, ammonium persulfate, sodium persulfate, potassium persulfate, and azo compounds such as azodiisobutyronitrile. Amine oxides and hydrazine salts can also be used as catalysts. Excellent results are obtained with peroxy compounds and their use is preferred. In general from 0.05 to 5% by weight of catalyst, based on the weight of monomers, is used. Polymerization temperatures within the range of 0° C. to 200° C., for a period between one and 48 hours, are advisable. In the same manner, polymerization pressures within the range of one to 1,000 atmospheres are recommended. Subatmospheric pressures and pressures up to 10,000 atmospheres or higher can also be used.

The fluorocyclobutene copolymers of this invention contain at least one fluorine atom per four-carbon atom ring in the fluorocyclobutene portion of the polymer. Markedly superior polymeric substances are afforded when the copolymers are copolymers of polyfluorocyclobutenes, particularly those had by copolymerizing a polyfluorocyclobutene having the general formula

wherein R is a monovalent radical selected from the group consisting of hydrogen, halogens and monovalent organic radicals, and the X substituents are selected from the group consisting of hydrogen and halogens. Hexafluorocyclobutene copolymers are preferred on account of the ease of their preparation and their superior qualities.

The copolymers of this invention possess advantages not previously combined in an organic compound. Since many of the polymeric materials of this invention are extremely stable, they are generally applicable for a wide variety of uses. Many of the products investigated have been found to be desirable in that they are substantially non-flammable and non-corrosive. Among other applications, the copolymers of this invention are useful in the preparation of films, molded articles, gaskets, and coating compositions.

As many apparently widely different embodiments of this invention may be made without departing from the spirit and scope thereof, it is to be understood that I do not limit myself to the specific embodiments thereof except as defined in the appended claims.

I claim:

1. A copolymer of hexafluorocyclobutene and a polymerizable monomeric ethylenically unsaturated compound having a terminal carbon-to-carbon double bond, said copolymer containing from 3 to 70% of said hexafluorocyclobutene.

2. A copolymer of hexafluorocyclobutene and ethylene, said copolymer containing from 3 to 70% of said hexafluorocyclobutene.

3. A copolymer of hexafluorocyclobutene and tetrafluoroethylene, said copolymer containing from 3 to 70% of said hexafluorocyclobutene.

4. A process which comprises maintaining hexafluorocyclobutene in admixture with a polymerizable monomeric ethylenically unsaturated compound having a terminal carbon-to-carbon double bond at a temperature within the range of 0° to 200° C. under a pressure from atmospheric to 10,000 atmospheres and in the presence of a free radical producing polymerization catalyst for a sufficient period of time to produce copolymerization of said monomeric materials.

5. A process which comprises maintaining hexafluorocyclobutene in admixture with ethylene at a temperature within the range of 0° to 200° C. under a pressure from atmospheric to 1,000 atmospheres and in the presence of a peroxy polymerization catalyst for a sufficient period of time to produce copolymerization of said monomeric materials.

6. A process which comprises maintaining hexafluorocyclobutene in admixture with tetrafluoroethylene at a temperature within the range of 0° to 200° C. under a pressure from atmospheric to 1,000 atmospheres and in the presence of a peroxy polymerization catalyst for a sufficient period of time to produce copolymerization of said monomeric materials.

7. A copolymer of a polymerizable monomeric ethylenically unsaturated compound having a terminal carbon-to-carbon double bond and of a monomeric polyfluorocyclobutene having attached to the cyclobutene ring solely halogen atoms of which at least two are fluorine atoms, said copolymer containing from 10 to 50% of said polyfluorocyclobutene.

8. A copolymer of a polymerizable monomeric ethylenically unsaturated compound having a terminal carbon-to-carbon double bond and of a monomeric polyfluorocyclobutene having attached to the cyclobutene ring solely members of the group consisting of hydrogen and halogen atoms of which at least two are fluorine atoms, said copolymer containing from 10 to 50% of said polyfluorocyclobutene.

9. A copolymer of ethylene and of a monomeric polyfluorocyclobutene having attached to the cyclobutene ring solely members of the group consisting of hydrogen and halogen atoms of which at least two are fluorine atoms, said copolymer containing from at least 3 to 70% of said polyfluorocyclobutene.

10. A copolymer of tetrafluorethylene and of a monomeric polyfluorocyclobutene having attached to the cyclobutene ring solely members of the group consisting of hydrogen and halogen atoms of which at least two are fluorine atoms, said copolymer containing from at least 3 to 70% of said polyfluorocyclobutene.

11. A process which comprises maintaining a monomeric polyfluorocyclobutene having attached to the cyclobutene ring solely members of the group consisting of hydrogen and halogen atoms of which at least two are fluorine atoms in admixture with a polymerizable monomeric ethylenically unsaturated compound having a terminal carbon-to-carbon double bond at a temperature within the range of 0° to 200° C. under a pressure from atmospheric to 10,000 atmospheres and in the presence of a free radical producing polymerization catalyst for a sufficient period of time to produce copolymerization of said monomeric materials.

12. A process which comprises maintaining a monomeric polyfluorocyclobutene having attached to the cyclobutene ring solely members of the group consisting of hydrogen and halogen atoms of which at least two are fluorine atoms in admixture with a polymerizable monomeric ethylenically unsaturated compound having a terminal carbon-to-carbon double bond at a temperature within the range of 0° to 200° C. under a pressure from atmospheric to 1,000 atmospheres and in the presence of a peroxy polymerization catalyst for a sufficient period of time to produce copolymerization of said monomeric materials.

13. A process which comprises maintaining hexafluorocyclobutene in admixture with a polymerizable monomeric ethylenically unsaturated compound having a terminal carbon-to-carbon double bond at a temperature within the range of 0° to 200° C. under a pressure from atmospheric to 1,000 atmospheres and in the presence of a peroxy polymerization cataylst for a sufficient period of time to produce copolymerization of said monomeric materials.

14. A copolymer of a polymerizable monomeric ethylenically unsaturated compound having a terminal carbon-to-carbon double bond and of a monomeric polyfluorocyclobutene having attached to the cyclobutene ring solely hydrogen and halogen atoms of which at least two are fluorine atoms, said copolymer containing from 3 to 70% of said polyfluorocyclobutene.

15. A copolymer of a polymerizable monomeric ethylenically unsaturated compound having a terminal carbon-to-carbon double bond and of a monomeric polyfluorocyclobutene having attached to the cyclobutene ring solely halogen atoms of which at least two are fluorine atoms, said copolymer containing from at least 3 to 70% of said polyfluorocyclobutene.

JESSE HARMON.

REFERENCES CITED

The following references are of record in the file of this patent:

UNITED STATES PATENTS

| Number | Name | Date |
|---|---|---|
| 2,436,142 | Harmon | Feb. 17, 1948 |